(12) United States Patent
Filsfils et al.

(10) Patent No.: US 11,563,683 B2
(45) Date of Patent: Jan. 24, 2023

(54) SRV6 WITH MICRO SEGMENT IDENTIFIERS

(71) Applicant: Cisco Technology, Inc., San Jose, CA (US)

(72) Inventors: Clarence Filsfils, Brussels (BE); Jisu Bhattacharya, San Jose, CA (US); Zafar Ali, Hicksville, NY (US); Syed Kamran Raza, Kanata (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/493,334

(22) Filed: Oct. 4, 2021

(65) Prior Publication Data
US 2022/0029918 A1 Jan. 27, 2022

Related U.S. Application Data

(63) Continuation of application No. 17/066,140, filed on Oct. 8, 2020, now Pat. No. 11,362,946, which is a
(Continued)

(51) Int. Cl.
*H04L 12/749* (2013.01)
*H04L 45/741* (2022.01)
(Continued)

(52) U.S. Cl.
CPC ............ *H04L 45/741* (2013.01); *H04L 45/02* (2013.01); *H04L 45/745* (2013.01); *H04L 61/2557* (2013.01)

(58) Field of Classification Search
CPC ..... H04L 45/28; H04L 45/02; H04L 41/0816; H04L 63/08; H04L 41/0806; H04L 12/283; H04L 67/12; H04L 65/1069; H04L 63/0823; H04L 12/2818; H04L 67/06; H04L 29/06; H04L 67/10; H04L 67/26; H04L 69/28; H04L 67/303; H04L 12/2803; H04L 61/1511; H04L 43/0805;
(Continued)

(56) References Cited

U.S. PATENT DOCUMENTS

2019/0020583 A1 1/2019 Bashandy

OTHER PUBLICATIONS

International Search Report and Written Opinion for International Application No. PCT/US2020/030342, dated Jul. 28, 2020.
(Continued)

*Primary Examiner* — Jung Liu
(74) *Attorney, Agent, or Firm* — Baker Botts, LLP

(57) ABSTRACT

In one embodiment, a method includes receiving a packet comprising a destination address in a destination address field of the packet, where the destination address including at least a first global identifier and a second global identifier, determining that the first global identifier corresponds to the first network apparatus, determining that a local identifier in the destination address is associated with the first global identifier, identifying one or more instructions associated with the local identifier, performing one or more functions instructed by the one or more instructions, updating the destination address in the destination field of the packet to an updated destination address, determining a forwarding rule associated with the packet, and forwarding the packet with the updated destination address based on the forwarding rule.

26 Claims, 8 Drawing Sheets

Related U.S. Application Data continuation of application No. 16/403,070, filed on May 3, 2019, now Pat. No. 10,841,220.

(51) Int. Cl.
*H04L 45/02* (2022.01)
*H04L 45/745* (2022.01)
*H04L 61/2557* (2022.01)

(58) Field of Classification Search
CPC ..... H04L 67/02; H04L 45/74; H04L 61/1541; H04L 67/141; H04L 12/2823; H04L 67/143; H04L 12/281; H04L 12/18; H04L 12/66; H04L 45/12; H04L 45/50; H04L 12/1854; H04L 45/34; H04L 12/721; H04L 12/723; G06F 16/38; G06F 16/33; H04W 4/80; H04W 12/04; F24F 11/62; F24F 11/30; G08B 25/001; G08B 17/10; G08B 29/02; G05B 19/042; G05B 15/02; G05B 2219/2642

See application file for complete search history.

(56) References Cited

OTHER PUBLICATIONS

Chen., et al., Path Segment for SRv6 (Segment Routing in IPv6); Draft-Li-Spring-Srv6-Path-Segment-00; Internet-Draft: Spring Working Group, Internet Engineering Task Force, IETF; pp. 1-8, XP015129457, Oct. 22, 2018.

Camarillo., et al., SRV6 Network Programming; Draft-Ietf-Spring-SRV6-Network programming-00; Internet-Draft: Spring, Internet Engineering task force, IETF; pp. 1-42, XP015132673, Apr. 24, 2019.

Camarilllo., et al., Network Programming extension: SRv6 USID Instruction; Draft-Filsfils-Spring-Net-PGM-Extension-SRV6-usid-04, Internet-Draft: Spring, Internet Engineering Task Force, IETF; Standard Working Draft, INT, No. 4, pp. 1-14, XP015137883, Feb. 25, 2020.

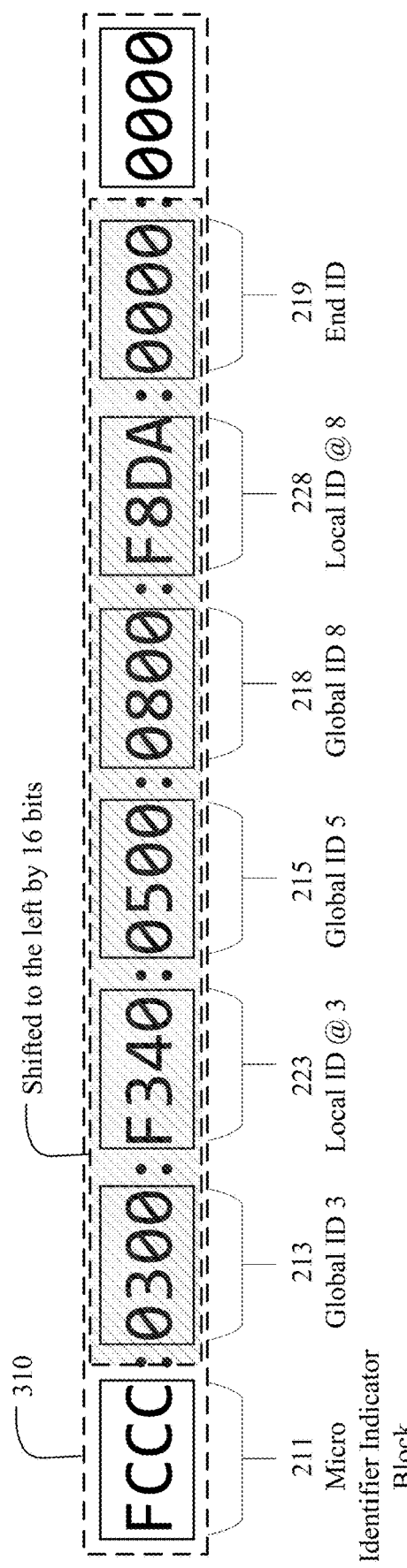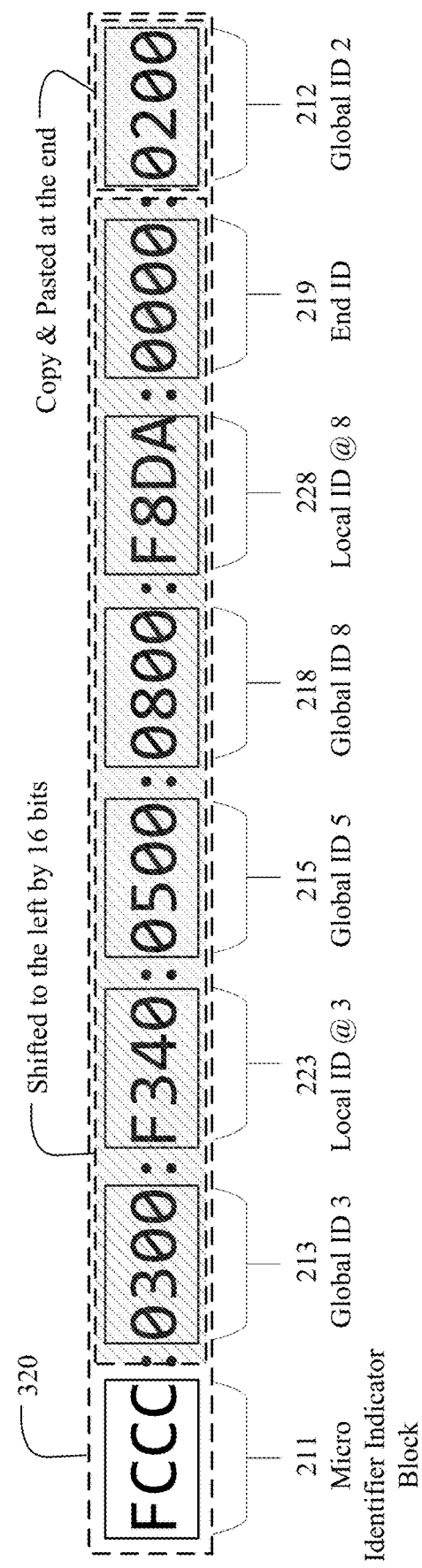

SRV6 WITH MICRO SEGMENT IDENTIFIERS

PRIORITY

This application is a continuation under 35 U.S.C. § 120 of U.S. patent application Ser. No. 17/066,140, filed 8 Oct. 2020, which is a continuation under 35 U.S.C. § 120 of U.S. patent application Ser. No. 16/403,070, filed 3 May 2019.

TECHNICAL FIELD

The present disclosure relates generally to a field of data communications, and more particularly, to representing a plurality of forwarding addresses in a single destination address.

BACKGROUND

The communications industry is rapidly changing to adjust to emerging technologies and ever-increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based on one or more values representing network nodes or paths.

BRIEF DESCRIPTION OF THE DRAWINGS

FIG. 3A illustrates an example destination address after being shifted by a length of a global identifier.

FIG. 3B illustrates an example destination address after a global identifier being rotated.

DESCRIPTION OF EXAMPLE EMBODIMENTS

Overview

Figure 1:
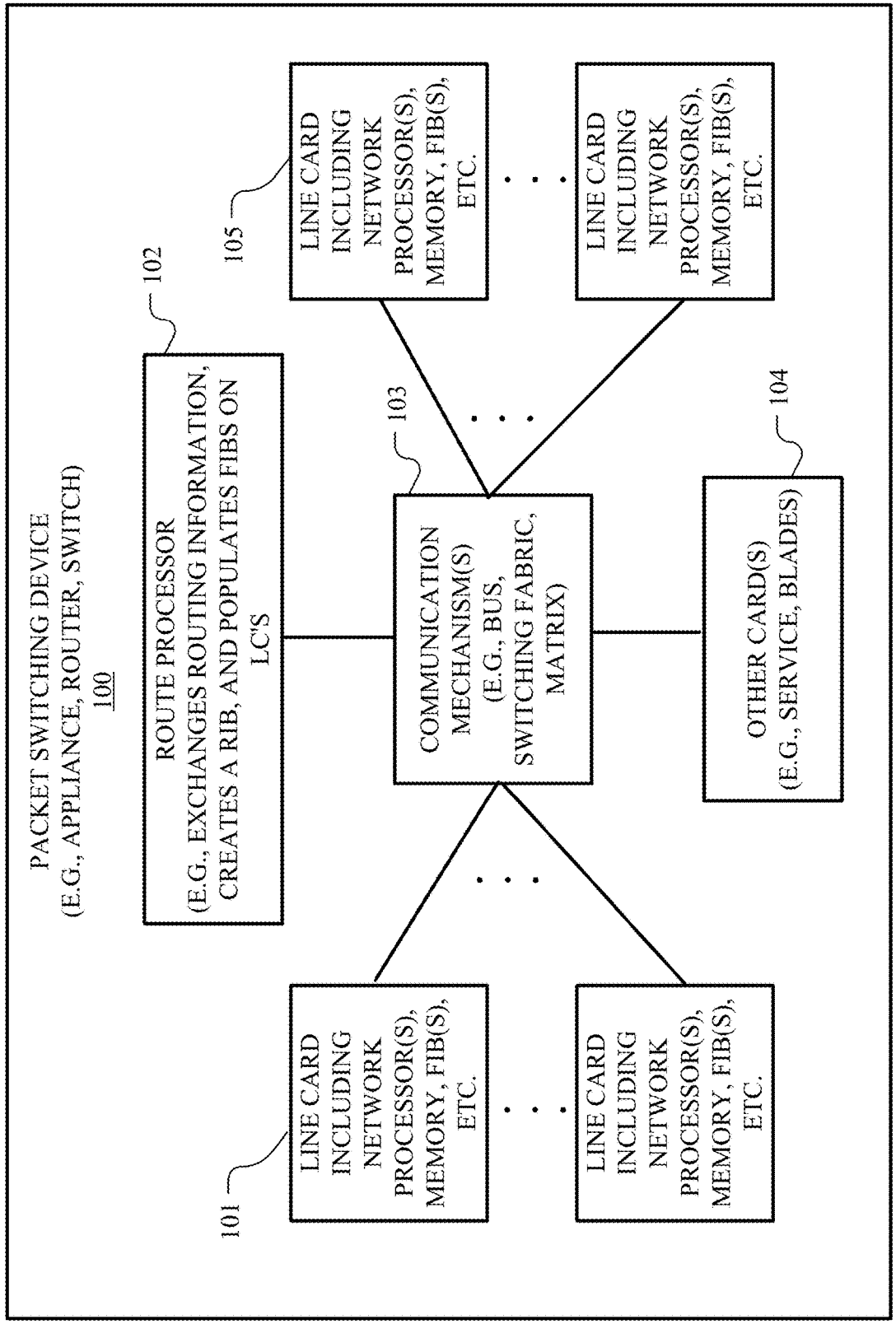
FIG. 1 illustrates an example packet switching system.

In particular embodiments, a Micro Segment Identifier (uSID) may comprise a pre-determined micro identifier indicator block. Any globally-allocated block may be used for the micro segment identifier indicator block. As an example and not by way of limitation, a Unique Local IPv6 Unicast Address (ULA) may be used for a uSID. Because FC/8 is available to any operator as ULA space, any leading bit string that starts with FC may be used as a micro segment identifier indicator block. A uSID may comprise one or more encoded identifiers. In particular embodiments, an encoded identifier may be a global identifier. A global identifier may uniquely identify a network apparatus in a network domain. A global identifier may be associated with one or more instructions. In particular embodiments, an encoded identifier may be a local identifier. A local identifier may be associated with one or more instructions. A local identifier may uniquely identify one or more instructions within a network apparatus associated with the local identifier. In particular embodiments, a uSID may comprise an end identifier. The end identifier may indicate that the identifier preceding the end identifier in the uSID is a last encoded identifier. In particular embodiments, a packet comprising a uSID as a destination address may be forwarded through one or more network apparatuses indicated by corresponding global identifiers in the uSID. When a non-final network apparatus in the forwarding path receives the packet, the destination address may comprise two or more global identifiers: one for the non-final network apparatus and one or more for other network apparatuses in the remaining forwarding path. When a final network apparatus in the forwarding path receives the packet, the destination address may comprise a global identifier corresponding to the final network apparatus and an end identifier, where no other global identifier corresponding to a network apparatus appears between the global identifier and the end identifier.

In particular embodiments, a first network apparatus may receive a packet comprising a destination address in a destination address field of the packet. The destination address may comprise at least a first global identifier and a second global identifier. The first network apparatus may determine that the first global identifier corresponds to the first network apparatus. The first network apparatus may determine that a local identifier in the destination address is associated with the first global identifier in response to the determination that the first global identifier corresponds to the first network apparatus. The first network apparatus may identify one or more instructions associated with the local identifier. The first network apparatus may perform one or more functions instructed by the one or more instructions. The first network apparatus may update the destination address in the destination field of the packet to an updated destination address. The updated destination address may comprise the second global identifier. The first network apparatus may determine a forwarding rule associated with the packet. The first network apparatus may forward the packet with the updated destination address based on the determined forwarding rule.

In particular embodiments, the first network apparatus may receive a packet comprising a first destination address in a destination address field of a header. The first destination address may comprise a first global identifier and an end identifier, where no other global identifier corresponding to a network apparatus appears between the first global identifier and the end identifier in the first destination address. The first network apparatus may determine that the first global identifier corresponds to the first network apparatus. The first network apparatus may identify one or more instructions associated with a combination of the first global identifier and the end identifier. The first network apparatus may perform one or more functions instructed by the one or more instructions. The one or more functions may comprise determining a forwarding rule associated with the packet. The first network apparatus may forward the packet based on the forwarding rule.

EXAMPLE EMBODIMENTS

FIG. 1 illustrates an example packet switching system. In particular embodiments, a packet switching device 100 may comprise multiple line cards 101 and 105, each with one or more network interfaces for sending and receiving packets over communications links (e.g., possibly part of a link aggregation group). The packet switching device 100 may also have a control plane with one or more processing elements 102 for managing the control plane and/or control plane processing of packets associated with forwarding of packets in a network. The packet switching device 100 may also include other cards 104 (e.g., service cards, blades) which include processing elements that are used to process (e.g., forward/send, drop, manipulate, change, modify, receive, create, duplicate, apply a service) packets associated with forwarding of packets in a network. The packet switching device 100 may comprise hardware-based communication mechanism 103 (e.g., bus, switching fabric, and/or matrix, etc.) for allowing its different entities 101, 102, 104 and 105 to communicate. Line cards 101 and 105 may typically perform the actions of being both an ingress and egress line card, in regard to multiple other particular packets and/or packet streams being received by, or sent from, packet switching device 100.

The ability for a network apparatus to specify a forwarding path, other than the normal shortest path, that a particular packet will traverse, may benefit a number of network functions. Segment Routing (SR) may leverage the source routing paradigm. SRv6 is an instantiation of SR on the Internet Protocol Version 6 (IPv6) data plane. In SRv6, a Segment Identifier (SID) is a standard 128 bit IPv6 address. To forward a packet over an explicit path consisting of a plurality of IPv6 SIDs, a list of IPv6 SIDs may be placed in a 'segment routing' extension header (SRH). Any intermediate network apparatuses along the explicit path must be able to read deep enough into the packet to process the addresses in the SRH. A network apparatus may have limited reading capability into a packet. Hence, the network apparatus may be forced to drop the packet or punt the packet for software switching, which is significantly slower than hardware switching. Encoding an explicit path containing a plurality of network apparatuses into a single IPv6 address may allow a network apparatus to process packets with SRv6 efficiently. Also, encoding the explicit path into a single IPv6 address may allow a source network apparatus to process the packet efficiently by eliminating a need to add an SRH into the IPv6 header. In particular embodiments, encoding the explicit path as set of micro segments may allow a source network apparatus to encode more segments for given capability of the network apparatus in terms of maximum number of IPv6 addresses that the source network apparatus can encode with full performance.

In particular embodiments, a Micro Segment Identifier (uSID) may comprise a pre-determined micro identifier indicator block. The uSID may be used as a destination address in an IPv6 header. On observing the pre-determined micro identifier indicator block in the destination address field of the IPv6 header, a network apparatus may determine that the destination address is a uSID. Any globally-allocated block may be used for the micro segment identifier indicator block. As an example and not by way of limitation, a Unique Local IPv6 Unicast Address (ULA) may be used for a uSID. Because FC/8 is available to any operator as ULA space, any leading bit string that starts with FC may be used as a micro segment identifier indicator block. An operator may use FCCC/16 as the micro segment identifier indicator block in their network. Although this disclosure describes a particular micro segment identifier indicator block, this disclosure contemplates any suitable micro segment identifier indicator block.

Figure 2A:
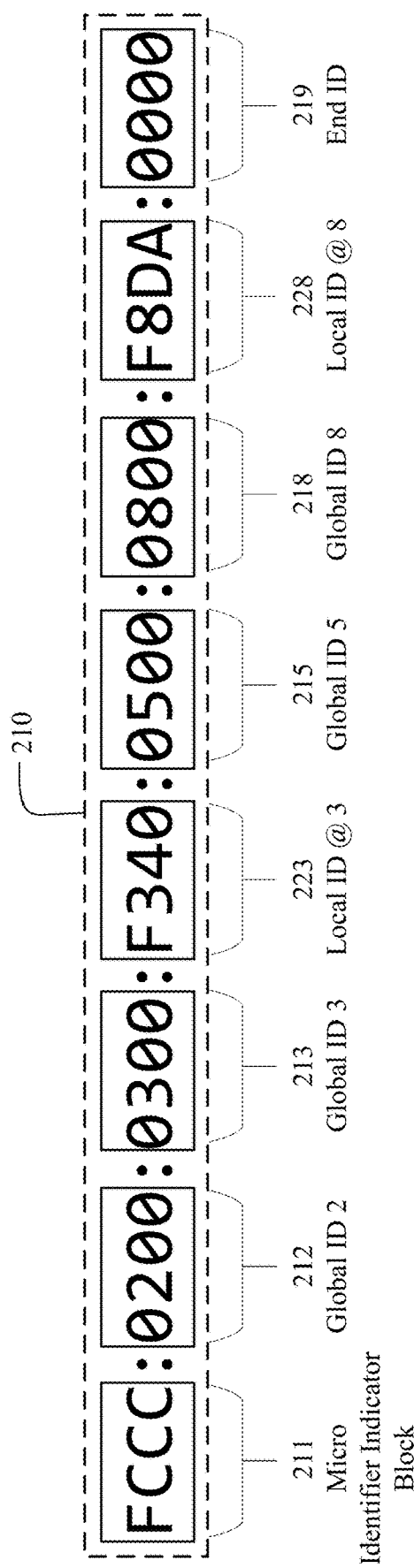
FIG. 2A illustrates an example Micro Segment Identifier (uSID).

In particular embodiments, a uSID may comprise one or more encoded identifiers. An encoded identifier may be a global identifier. A global identifier may uniquely identify a network apparatus in a network domain. A global identifier may be associated with one or more instructions. In particular embodiments, an encoded identifier may be a local identifier. A local identifier may be associated with one or more instructions. A local identifier may uniquely identify one or more instructions within a network apparatus associated with the local identifier. When a first network apparatus corresponds to a first global identifier and a second network apparatus corresponds to a second global identifier, a particularly encoded local identifier at the first network apparatus may correspond to instructions different to instructions corresponding to the particularly encoded local identifier at the second network apparatus. In particular embodiments, a uSID may comprise an end identifier. The end identifier may indicate that the identifier preceding the end identifier in the uSID is a last encoded identifier. FIG. 2A illustrates an example uSID. The uSID 210 illustrated in FIG. 2A comprises four global identifiers 212, 213, 215, and 218. The uSID 210 illustrated in FIG. 2A comprises two local identifiers 223 and 228. The uSID 210 illustrated in FIG. 2A comprises one end identifier 219. Although this disclosure describes a uSID in a particular manner, this disclosure contemplates a uSID in any suitable manner.

In particular embodiments, a global identifier may comprise one or more predetermined bit sequences. A network apparatus may identify a global identifier based on the one or more predetermined bit sequences encoded in the global identifier. A local identifier may comprise one or more predetermined bit sequences. A network apparatus may identify a local identifier based on the one or more predetermined bit sequences encoded in the local identifier. As an example and not by way of limitation, illustrated in FIG. 2A, a length of a global identifier is four nibbles (16 bits). The first nibble (four bits) of a global identifier may be zero. Thus, a network apparatus may determine that the global identifier 212 is a global identifier based on the fact that the first nibble of the identifier 212 is zero. As another example and not by way of limitation, illustrated in FIG. 2A, a length of a local identifier is four nibbles (16 bits). The first nibble of the identifier 223 may be 'F' to indicate that the identifier 223 is a local identifier. Although this disclosure describes a particular length of an encoded identifier, this disclosure contemplates any suitable length of an encoded identifier. Although this disclosure describes determining global identifiers and local identifiers in a particular manner, this disclosure contemplates determining global identifiers and local identifiers in any suitable manner.

In particular embodiments, an end identifier may comprise one or more predetermined bit sequences. A network apparatus may identify an end identifier based on the one or more predetermined bit sequences encoded in the local identifier. As an example and not by way of limitation, illustrated in FIG. 2A, a length of an end identifier is four nibbles (16 bits). The identifier 219 is encoded '0000' to indicate that the identifier 219 is an end identifier. Although this disclosure describes a particular end identifier, this disclosure contemplates any suitable end identifier.

Figure 2B:
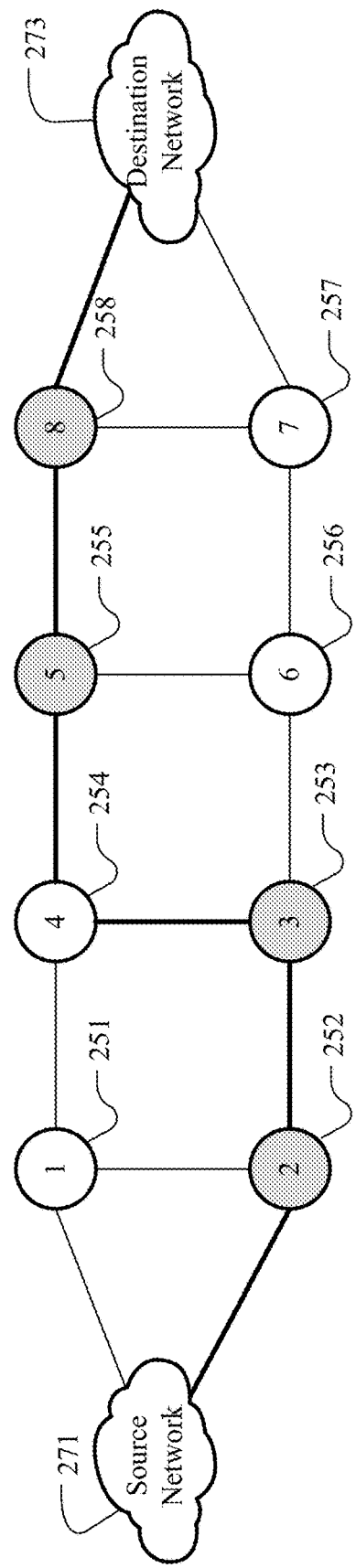
FIG. 2B illustrates an example packet forwarding based on a uSID.

In particular embodiments, the micro identifier indicator block concatenated by a first global identifier may be a first address corresponding to a first network apparatus. The first network apparatus may advertise the first address within the network domain. Other network apparatuses within the network domain may update their corresponding forwarding tables upon receiving the advertised first address. When a packet with the first address arrives at a network apparatus, the network apparatus may forward the packet such that the packet is routed to the first network apparatus within the network domain. FIG. 2B illustrates an example packet forwarding based on a uSID. As an example and not by way of limitation, illustrated in FIG. 2A and FIG. 2B, a second global identifier 212 may correspond to a second network apparatus 252. The second network apparatus 252 may advertise the second address "FCCC:0200/32" using one or more routing protocols. On receiving the advertisement from the second network apparatus 252, the first network apparatus 251 may update its forwarding information base (FIB). When the first network apparatus 251 receives a packet with a destination address starting with "FCCC:0200", the first network apparatus 251 may forward the packet to the second network apparatus 252 through an appropriate interface. As another example and not by way of limitation, illustrated in FIG. 2A and FIG. 2B, a third global identifier 213 may correspond to a third network apparatus 253. The third network apparatus 253 may advertise the second address "FCCC:0300/32" using one or more routing protocols. On receiving the advertisement from the third network apparatus 253, the second network apparatus 252 may update its forwarding information base (FIB). When the second network apparatus 252 receives a packet with a destination address starting with "FCCC:0300", the second network apparatus 252 may forward the packet to the third network apparatus 253 through an appropriate interface. Although this disclosure describes constructing an address corresponding to a network apparatus by a micro identifier indicator block and a global identifier corresponding to the network apparatus in a particular manner, this disclosure contemplates constructing an address corresponding to a network apparatus by a micro identifier indicator block and a global identifier corresponding to the network apparatus in any suitable manner.

In particular embodiments, a source network 271 may want to send a packet to a destination network 273 through a pre-determined forwarding path in an infrastructure network. The infrastructure network may comprise the first network apparatus 251, the second network apparatus 252, the third network apparatus 253, a fourth network apparatus 254, a fifth network apparatus 255, a sixth network apparatus 256, a seventh network apparatus 257, and an eighth network apparatus 258. All the network apparatuses but the fourth network apparatus 254 in the forwarding network may be SRv6 capable network apparatuses. The pre-determined forwarding path may comprise the second network apparatus 252, the third network apparatus 253, the fourth network apparatus 254, the fifth network apparatus 255 and the eighth network apparatus 258. The source network 271 may construct a uSID 210 illustrated in FIG. 2A to route the packet to the destination network 273. The source network 271 may put the constructed uSID 210 to the destination address field of the IPv6 header of the packet and forward the packet to the second network apparatus 252. The source network 271 may determine an interface to forward the packet by looking up the uSID 210 in its own FIB. A matched longest prefix of the uSID 210 at the FIB may be "FCCC:0200/32", the second address corresponding to the second network apparatus 252. Although this disclosure describes constructing a uSID based on a pre-determined forwarding path for a packet in a particular manner, this disclosure contemplates constructing a uSID based on a pre-determined forwarding path for a packet in any suitable manner.

In particular embodiments, a second network apparatus 252 may receive a packet comprising a destination address in a destination address field of the packet. The destination address in the destination address field may be the uSID 210. The destination address may comprise the micro identifier indicator block 211 concatenated by the second global identifier 212. The second network apparatus 252 may determine that the second global identifier 212 corresponds to the second network apparatus 252. The second network apparatus 252 may identify one or more instructions associated with the second global identifier 212 by looking up "FCCC:0200/32" in the FIB of the second network apparatus 252. The one or more instructions may comprise updating the destination address in the destination field of the packet to an updated destination address. Although this disclosure describes determining one or more instructions upon receiving a packet comprising a global identifier corresponding to the network apparatus in a particular manner, this disclosure contemplates determining one or more instructions upon receiving a packet comprising a global identifier corresponding to the network apparatus in any suitable manner.

In particular embodiments, the second network apparatus 252 may perform one or more functions instructed by the one or more instructions. The one or more functions may comprise updating the destination address in the destination field of the packet to an updated destination address. The second network apparatus 252 may shift bits in the destination address, except the bits belonging to the micro identifier indicator block 211, to the left by a number of bits for the second global identifier 212 in order to update the destination address in the destination field of the packet to the updated destination address. The updated destination address may comprise the third global identifier 213. As an example and not by way of limitation, illustrated in FIG. 2A and FIG. 2B, the second network apparatus 252 may shift bits in a range <32, 127> of the destination address to the left by 16 bits (the length of the second global identifier 212). In particular embodiments, the second network apparatus 252 may perform a bitwise shift operation to shift bits. In particular embodiments, the second network apparatus 252 may copy bits in the range <32, 127> and paste to a range <16, 111> and set bits in a range <112, 127> to zeros. FIG. 3A illustrates an example destination address after being shifted by a length of a global identifier. The updated destination address 310 may comprise the micro identifier indicator block 211 concatenated by the third global identifier 213 in the updated destination address, which may be the third address "FCCC:0300/32" corresponding to the third network apparatus 253. Although this disclosure describes updating the destination address in a particular manner, this disclosure contemplates updating the destination address in any suitable manner.

In particular embodiments, updating the destination address in the destination field of the packet to the updated destination address may further comprise writing the second global identifier 212 to the last k bits of the destination address, where k is the number of bits for the second global identifier 212. As an example and not by way of limitation, illustrated in FIG. 3A, the second network apparatus 252 may copy the second global identifier 213 before shifting the bits in the destination address, and write the copied second global identifier 213 to the last 16 bits of the updated destination address 310. FIG. 3B illustrates an example destination address after a global identifier being rotated. The second global identifier 213 may be written at the end of the updated destination address 320. Although this disclosure describes updating the destination address by rotating a global identifier at the end of the destination address in a particular manner, this disclosure contemplates updating the destination address by rotating a global identifier at the end of the destination address in any suitable manner.

In particular embodiments, the second network apparatus 252 may determine a forwarding rule associated with the packet. The second network apparatus 252 may determine the forwarding rule associated with the packet by looking up the third address "FCCC:0300" in a forwarding table at the second network apparatus 252. Although this disclosure describes determining a forwarding rule based on the updated destination address in a particular manner, this disclosure contemplates determining a forwarding rule based on the updated destination address in any suitable manner.

In particular embodiments, the third network apparatus 253 may receive a packet comprising a destination address 310 in a destination address field of the packet. The destination address 310 may comprise at least the third global identifier 213 and the fifth global identifier 215 as illustrated in FIG. 3A. The third network apparatus 253 may determine that the third global identifier 213 corresponds to the third network apparatus 253 by looking up the third address "FCCC:0300/32" in the FIB of the third network apparatus 253. In particular embodiments, the third network apparatus 253 may determine that the local identifier 223 in the destination address 310 is associated with the third global identifier 213 in response to the determination that the third global identifier 213 corresponds to the third network apparatus 253. The third network apparatus 253 may determine that the local identifier 223 immediately follows the third global identifier 213 corresponding to the third network apparatus 253 in the destination address 310. The third network apparatus 253 may identify one or more instructions associated with the local identifier 223. The third network apparatus 253 may look up the micro identifier indicator block 211 concatenated by the local identifier 223 "FCCC:F340/32" in the FIB of the third network apparatus 253 to identify the one or more instructions associated with the local identifier 223. In particular embodiments, the third network apparatus 253 may look up the micro identifier indicator block 211 concatenated by the third global identifier 213 and the local identifier 223 "FCCC:0300:F340/48" in the FIB of the third network apparatus 253 to determine that the third global identifier 213 corresponds to the third network apparatus 253, to determine that the local identifier 223 in the destination address 310 is associated with the third global identifier 213, and to identify one or more instructions associated with a combination of the global identifier 213 and the local identifier 223. Although this disclosure describes identifying one or more instructions associated with the local identifier in a particular manner, this disclosure contemplates identifying one or more instructions associated with the local identifier in any suitable manner.

In particular embodiments, the third network apparatus 253 may perform one or more functions instructed by the one or more instructions. The one or more instructions may comprise cross-connecting to a neighbor network apparatus. The neighbor network apparatus may be identified by the local identifier. The third network apparatus 253 may determine a forwarding rule associated with the packet. When the one or more instructions may comprise cross-connecting to a neighbor network apparatus, determining the forwarding rule associated with the packet may comprise identifying an interface for forwarding the packet to the neighbor network apparatus. As an example and not by way of limitation, illustrated in FIG. 2B and FIG. 3A, the third network apparatus 253 may determine that the local identifier 223 'F340' corresponds to cross-connecting to a neighbor network apparatus. The local identifier 223 also provides an identity of an interface on the third network apparatus that connects to the fourth network apparatus 254 in the example illustrated in FIG. 2B and FIG. 3A. Although this disclosure describes particular functions corresponding a local identifier, this disclosure contemplates any suitable functions corresponding a local identifier.

Figure 4A:
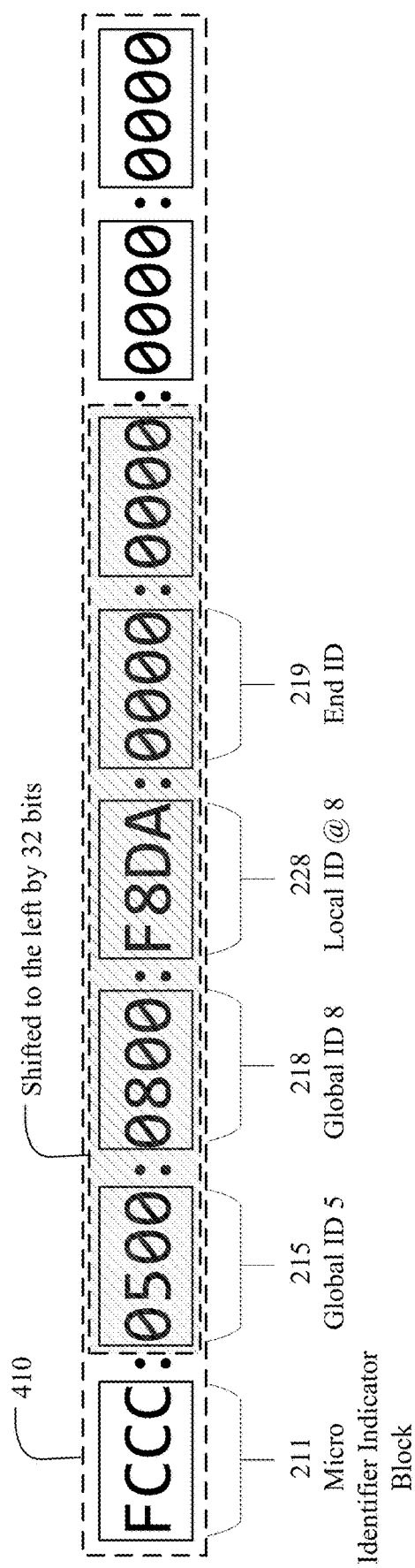
FIG. 4A illustrates an example destination address after shifting bits by a number of bits for a global identifier and a local identifier.

In particular embodiments, the third network apparatus 253 may update the destination address in the destination field of the packet to an updated destination address. In particular embodiments, the third network apparatus 253 may shift bits in the destination address except the bits belonging to the micro identifier indicator block 211 to the left by a number of bits for the third global identifier 213 and the local identifier 223 in order to update the destination address in the destination field of the packet to the updated destination address. FIG. 4A illustrates an example destination address after shifting bits by a number of bits for a global identifier and a local identifier. As an example and not by way of limitation, illustrated in FIG. 4A, the third network apparatus 253 may shift bits in a range <48, 127> of the destination address to the left by 32 bits. In particular embodiments, the third network apparatus 253 may perform a bitwise shift operation to shift bits. In particular embodiments, the third network apparatus 253 may copy bits in the range <48, 127> and paste to a range <16, 95> and set bits in a range <96, 127> to zeros. The updated destination address 410 may comprise the fifth global identifier 215 corresponding to the fifth network apparatus 255. The micro identifier indicator block 211 concatenated by the fifth global identifier 215 in the updated destination address 410 may be the fifth address corresponding to the fifth network apparatus 255. Although this disclosure describes updating the destination address by shifting bits in a particular manner, this disclosure contemplates updating the destination address by shifting bits in any suitable manner.

In particular embodiments, the third network apparatus 253 may shift bits in the destination address except the bits belonging to the micro identifier indicator block 211 to the left by a number of bits for the third global identifier 213 before identifying the one or more instructions associated with the local identifier 223. The third network apparatus 253 may identify the one or more instructions associated with the local identifier 223 by looking up the updated destination address in the FIB. After that, the third network apparatus 253 may shift bits in the shifted destination address except the bits belonging to the micro identifier indicator block 211 to the left by a number of bits for the local identifier 223 in order to complete updating the destination address. Although this disclosure describes updating the destination address by shifting bits in a particular manner, this disclosure contemplates updating the destination address by shifting bits in any suitable manner.

Figure 4B:
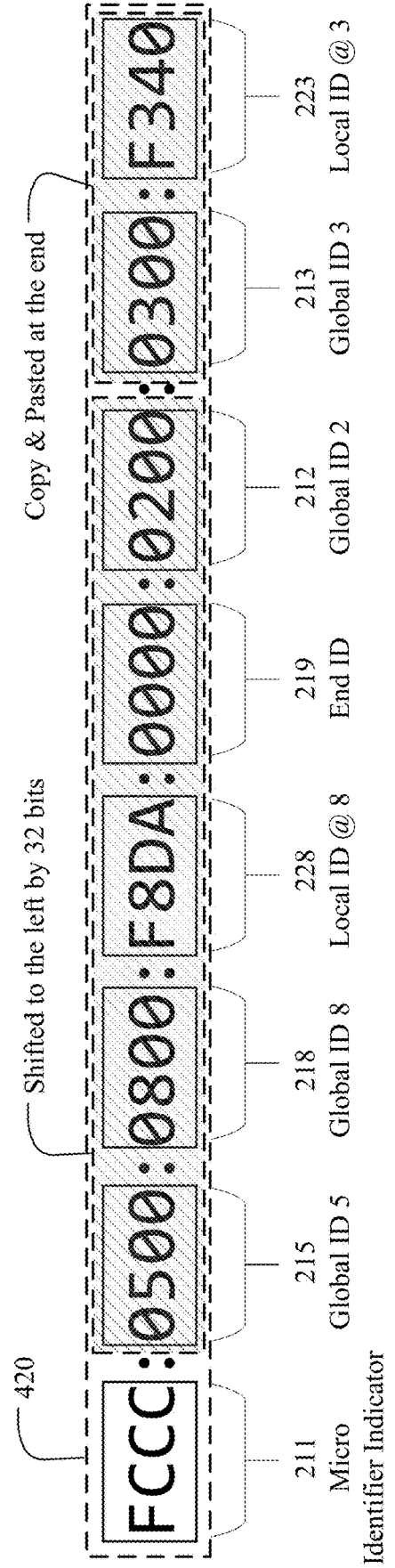
FIG. 4B illustrates an example updated destination address after rotating a global identifier and a local identifier.

In particular embodiments, updating the destination address in the destination field of the packet to the updated destination address may further comprise writing the first global identifier and the local identifier to the last k bits of the destination address, where k is the number of bits for the first global identifier and the local identifier. FIG. 4B illustrates an example updated destination address after rotating a global identifier and a local identifier. As an example and not by way of limitation, the third network apparatus 253 copies the third global identifier 213 and the local identifier 223 to a memory. The third network apparatus 253 may write the third global identifier 213 and the local identifier 223 at the end of the updated destination address 420 after shifting the bits to the left by 32 bits. Although this disclosure describes updating the destination address by rotating encoded identifiers in a particular manner, this disclosure contemplates updating the destination address by rotating encoded identifiers in any suitable manner.

In particular embodiments, the third network apparatus 253 may forward the packet with the updated destination address 410 based on the determined forwarding rule. The fourth network apparatus 254 may receive the packet with the updated destination address 410 in the destination address field. Because the fourth network apparatus 254 may not be capable of processing a uSID, the fourth network apparatus 254 may process the packet as a usual IPv6 packet. The fourth network apparatus 254 may look up the destination address 410 in its FIB and may find that the fifth address "FCCC:0500/32" is a longest prefix match among the elements in the FIB. The fourth network apparatus 254 may forward the packet towards the fifth network apparatus 255. The fifth network apparatus 255 may process the packet similar to the second network apparatus 252 and forward the packet with an updated destination address to the eighth network apparatus 258. Although this disclosure describes forwarding the packet through network apparatuses in a particular manner, this disclosure contemplates forwarding the packet through network apparatuses in any suitable manner.

In particular embodiments, the eighth network apparatus 258 may receive a packet comprising a destination address in a destination address field of a header. The destination address may comprise an eighth global identifier 218 and an end identifier 219, where no other global identifier corresponding to a network apparatus appears between the eighth global identifier 218 and the end identifier 219 in the eighth destination address. The end identifier 219 may indicate that the eighth global identifier 219 is a last global identifier in the destination address. The eighth global identifier 218 may be followed by a local identifier 228 before the end identifier 219. The eighth network apparatus 258 may determine that the eighth global identifier 218 corresponds to the eighth network apparatus 258. Although this disclosure describes receiving a packet by the last network apparatus of a path defined by a uSID in a particular manner, this disclosure contemplates receiving a packet by the last network apparatus of a path defined by a uSID in any suitable manner.

In particular embodiments, the eighth network apparatus 258 may identify one or more instructions associated with a combination of the eighth global identifier 218, the local identifier 228, and the end identifier. The eighth network apparatus 258 may look up the received destination address in the FIB to identify the one or more instructions. In particular embodiments, the eighth network apparatus 258 may shift the destination address by a number of bits for the eighth global identifier and look up the updated destination address in the FIB to identify the one or more instructions. As an example and not by way of limitation, the eighth network apparatus 258 may look up "FCCC:0800:F8DA: 0000/64" in the FIB of the eighth network apparatus 258 to identify one or more instructions associated with the combination of the eighth global identifier 218, the local identifier 228, and the end identifier 219. As another example and not by way of limitation, the eighth network apparatus 258 may look up "FCCC:0800/32" in the FIB to determine that the global identifier '0800' corresponds to the eighth network apparatus 258. The eighth network apparatus 258 may shift the bits <32, 127> to the left by 16 bits. The eighth network apparatus 258 may look up "FCCC:F8DA:0000/ 48" in the FIB to identify the one or more instructions associated with the combination of the local identifier 228 and the end identifier 219. Although this disclosure describes identifying one or more instructions at the last network apparatus of a path defined by a uSID in a particular manner, this disclosure contemplates identifying one or more instructions at the last network apparatus of a path defined by a uSID in any suitable manner.

In particular embodiments, the eighth network apparatus 258 may perform one or more functions instructed by the one or more instructions. In particular embodiments, the one or more functions may comprise determining a forwarding rule associated with the packet. In particular embodiments, the one or more functions corresponding to the one or more instructions may comprise decapsulating an outer header and zero or more extension headers of the outer header from the packet. In particular embodiments, the eighth network apparatus 258 may determine a forwarding rule associated with a destination address in the decapsulated packet. In particular embodiments, the eighth network apparatus 258 may look up the destination address in a FIB identified by the local identifier 228 to determine the forwarding rule. As an example and not by way of limitation, continuing with a prior example, the one or more instructions may comprise decapsulating the packet. The eighth network apparatus 258 may decapsulate the outer header and its extension headers, if any. In particular embodiments, the decapsulated packet may be an IPv6 packet. In particular embodiments, the decapsulated packet may be an IPv4 packet. In particular embodiments, the decapsulated packet may be an Ethernet frame. Although this disclosure describes particular formats for the decapsulated packet, this disclosure contemplates any suitable formats for the decapsulated packet. The eighth network apparatus 258 may determine a forwarding rule for the decapsulated packet by looking up the destination address in the decapsulated packet header in a FIB identified by the local identifier 228. In particular embodiments, the eighth network apparatus 258 may forward the decapsulated packet based on the forwarding rule. Although this disclosure describes particular one or more functions instructed by the particular one or more instructions, this disclosure contemplates any suitable one or more functions instructed by the any suitable one or more instructions.

In particular embodiments, the one or more functions corresponding to the one or more instructions may further comprise forwarding the decapsulated packet to a neighbor network apparatus. An interface connecting to the neighbor network apparatus may be identified by the local identifier 228. As an example and not by way of limitation, the one or more instructions may comprise decapsulating the packet. The eighth network apparatus 258 may decapsulate the outer header and its extension headers, if any. The one or more instructions may further comprise forwarding the decapsulated packet to a neighbor network apparatus through an interface identified by the local identifier 228. The eighth network apparatus 258 may forward the decapsulated packet to a network apparatus in the destination network 273. The eighth network apparatus 258 may have an interface connected to the network apparatus in the destination network 273. In particular embodiments, the eighth network apparatus 258 may forward the packet through the interface. Although this disclosure describes cross-connecting a decapsulated packet based on a local identifier in a particular manner, this disclosure contemplates cross-connecting a decapsulated packet based on a local identifier in any suitable manner.

Figure 5A:
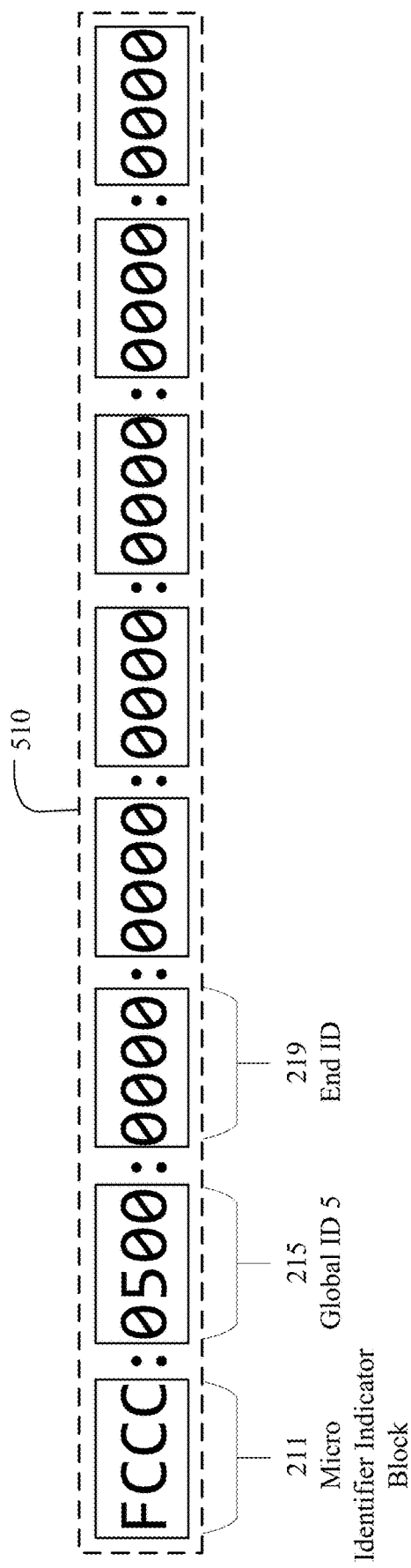
FIG. 5A illustrates an example destination address for integration of uSID with Segment Routing Header (SRH).
Figure 5B:
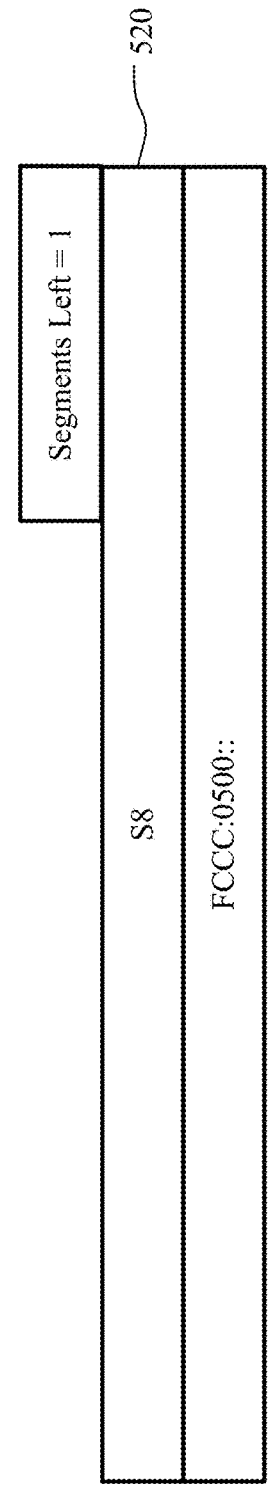
FIG. 5B illustrates an example SRH for integration uSID with SRH.

In particular embodiments, a network apparatus may not be capable of handling a uSID, but still capable of handling SRv6 with an SRH. FIG. 5A illustrates an example destination address for integration of uSID with SRH. In an example illustrated in FIG. 5A, the eighth network apparatus 258 is not capable of handling uSID. The fifth global identifier 215 is the last identifier in the destination address 510. A value for the next header field in the outer header may be SRH. FIG. 5B illustrates an example SRH for integration of uSID with SRH. The first element in the SRH "FCCC: 0500::" is an address corresponding to the fifth network apparatus 255 in a uSID. The next element in the SRH is S8, an IPv6 address or an SRv6 SID for the eighth network apparatus 258.

In particular embodiments, the fifth network apparatus 255 may receive a packet comprising an outer header and an extension header as illustrated in FIG. 5A and FIG. 5B. The outer header may comprise a destination address in a destination address field of the outer header. The destination address may comprise a fifth global identifier 215 and an end identifier 219, where no other global identifier corresponding to a network apparatus appears between the fifth global identifier 215 and the end identifier 219. The end identifier 219 may indicate that the fifth global identifier 215 is a last global identifier corresponding to a network apparatus in the destination address. The fifth network apparatus 255 may determine that the fifth global identifier 215 corresponds to the fifth network apparatus 255 by looking up "FCCC:0500: 0000/48" in an FIB of the fifth network apparatus 255. The fifth network apparatus 255 may identify one or more instructions associated with a combination of the fifth global identifier 215 and the end identifier 219. The fifth network apparatus 255 may perform one or more functions instructed by the one or more instructions. In particular embodiments, the one or more functions may comprise determining a forwarding rule associated with the packet based at least on one of the one or more inner headers. In particular embodiments, a next header field of the outer header may indicate a segment routing header. Then, the one or more functions may comprise replacing the destination address in the destination address field of the outer header with a second address from the segment routing header, which is one of the one or more inner headers, and determining a forwarding rule associated with the second address. As an example and not by way of limitation, illustrated in FIG. 5A and FIG. 5B, the fifth network apparatus 255 receives a packet with the destination address 510. The next header field in the outer IPv6 header may be SRH. The fifth network apparatus 255 determines that the fifth global identifier 215 corresponds to the fifth network apparatus 255 and the fifth global identifier 215 is the last encoded identifier in a uSID by looking up "FCCC:0500:0000/48" in an FIB. The fifth network apparatus 255 determines that the next header is SRH. The fifth network apparatus 255 replaces the value of the destination address field in the outer IPv6 header with the next segment 'S8' of the SRH 520 in the packet. The fifth network apparatus 255 determines a forwarding rule by looking up 'S8' in the FIB. The fifth network apparatus 255 forwards the packet with 'S8' in the destination field to the eighth network apparatus 258. Although this disclosure describes integrating a uSID with SRH in a particular manner, this disclosure contemplates integrating a uSID with SRH in any suitable manner.

Figure 6:
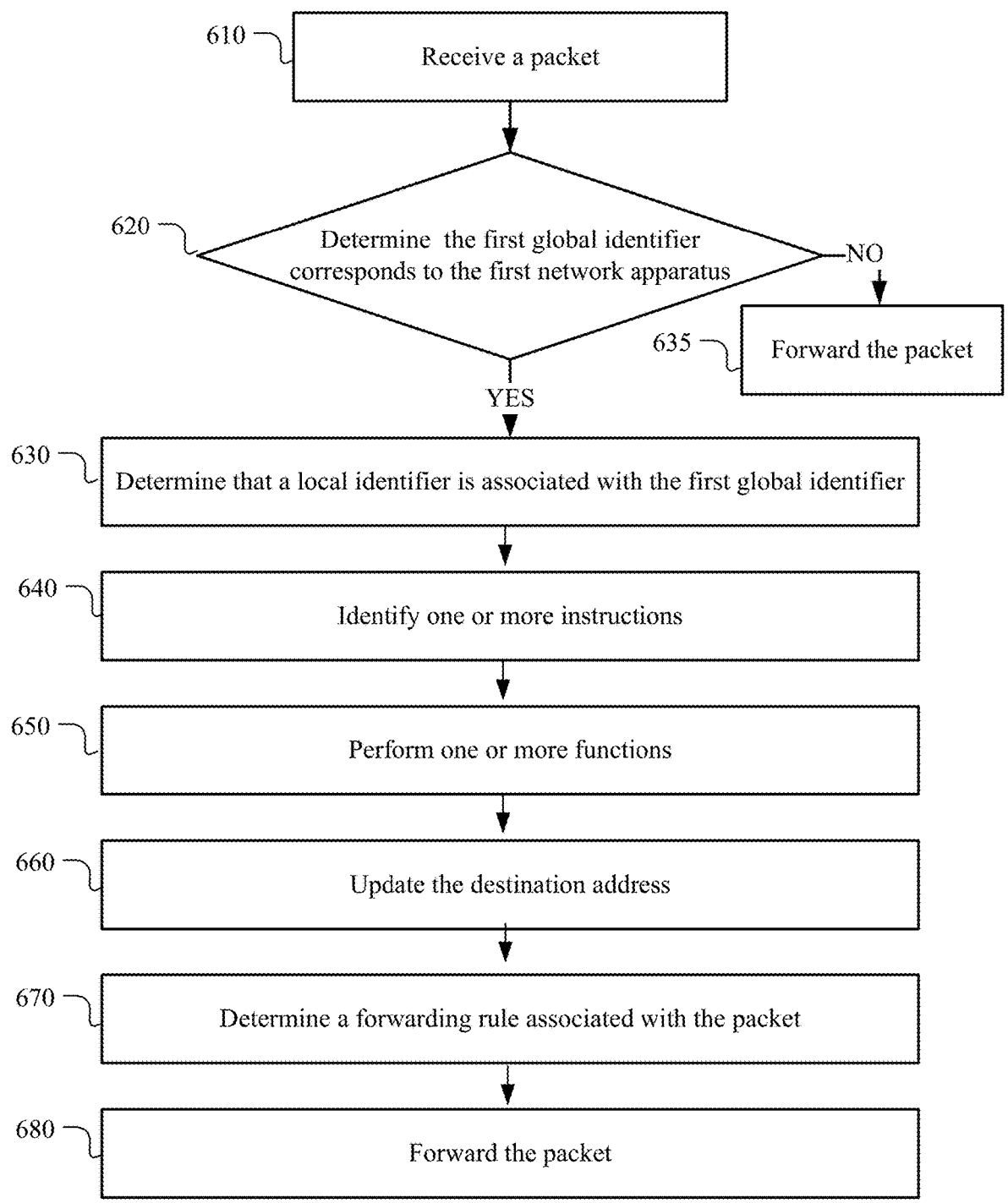
FIG. 6 illustrates an example method for processing a packet with a local identifier in a uSID.

FIG. 6 illustrates an example method 600 for processing a packet with a local identifier in a uSID. The method may begin at step 610, where a first network apparatus may receive a packet comprising a destination address in a destination address field of the packet. The destination address may comprise at least a first global identifier and a second global identifier. At step 620, the first network apparatus may determine that the first global identifier corresponds to the first network apparatus. At step 630, the first network apparatus may determine that a local identifier in the destination address is associated with the first global identifier in response to the determination that the first global identifier corresponds to the first network apparatus. At step 635, the first network apparatus may forward the packet if the first global identifier does not correspond to the first network apparatus. At step 640, the first network apparatus may identify one or more instructions associated with the local identifier. At step 650, the first network apparatus may perform one or more functions instructed by the one or more instructions. At step 660, the first network apparatus may update the destination address in the destination field of the packet to an updated destination address. The updated destination address may comprise the second global identifier. At step 670, the first network apparatus may determine a forwarding rule associated with the packet. At step 680, the first network apparatus may forward the packet with the updated destination address based on the determined forwarding rule. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for processing a packet with a local identifier in a uSID including the particular steps of the method of FIG. 6, this disclosure contemplates any suitable method for processing a packet with a local identifier in a uSID including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
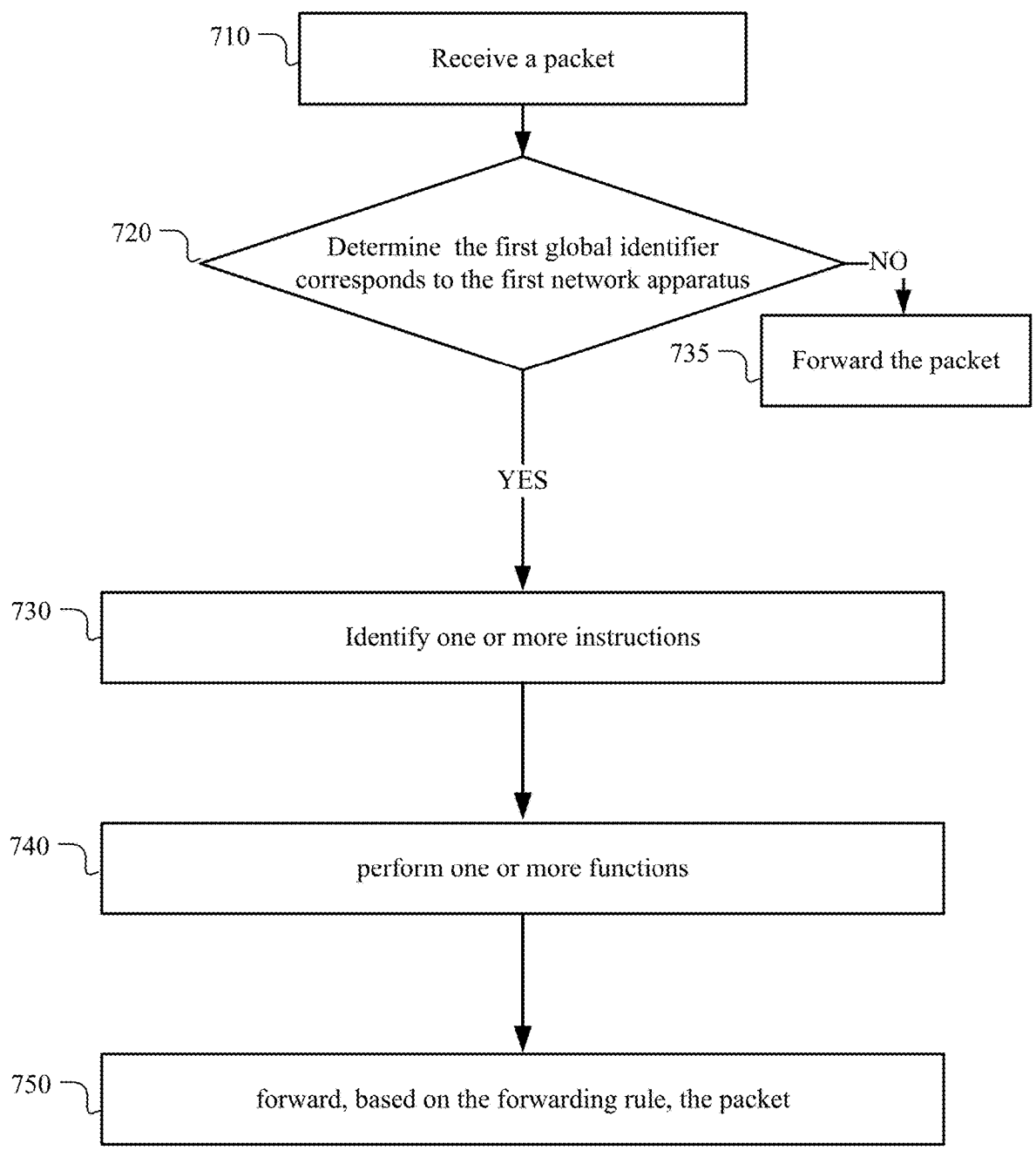
FIG. 7 illustrates an example method for processing a packet with uSID at a last network apparatus in a path.

FIG. 7 illustrates an example method 700 for processing a packet with uSID at a last network apparatus in a path. The method may begin at step 710, where the first network apparatus may receive a packet comprising an outer header and one or more inner headers. The outer header may comprise a first destination address in a destination address field of the outer header. The first destination address may comprise a first global identifier and an end identifier, where no other global identifier corresponding to a network apparatus appears between the first global identifier and the end identifier in the first destination address. At step 720, the first network apparatus may determine that the first global identifier corresponds to the first network apparatus. At step 730, the first network apparatus may identify one or more instructions associated with a combination of the first global identifier and the end identifier. At step 735, the first network apparatus may forward the packet if the first global identifier does not correspond to the first network apparatus. At step 740, the first network apparatus may perform one or more functions instructed by the one or more instructions. The one or more functions may comprise determining a forwarding rule associated with the packet based at least on one of the one or more inner headers. At step 750, the first network apparatus may forward the packet based on the forwarding rule. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for processing a packet with uSID at a last network apparatus in a path including the particular steps of the method of FIG. 7, this disclosure contemplates any suitable method for processing a packet with uSID at a last network apparatus in a path including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
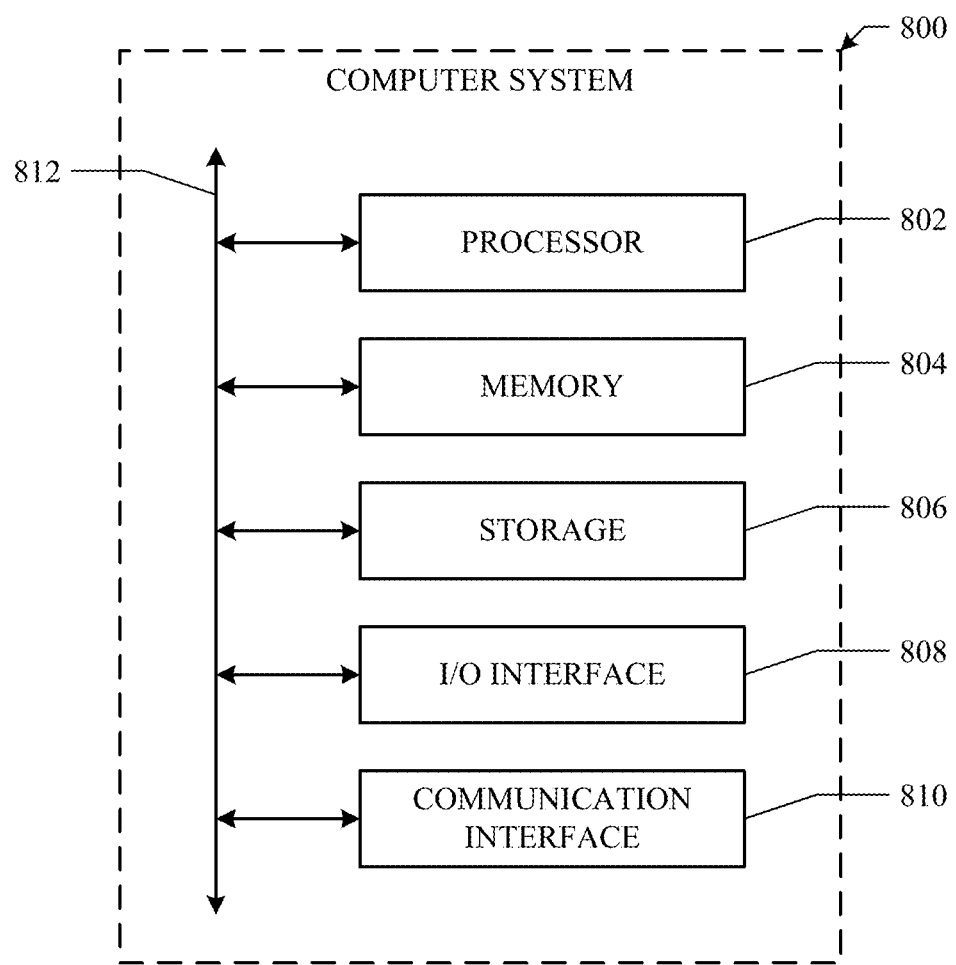
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first network apparatus, comprising:
   one or more processors; and
   one or more computer-readable non-transitory storage media coupled to the one or more processors and comprising instructions operable when executed by the one or more processors to cause the first network apparatus to:
   maintain a forwarding information base comprising a plurality of entries, wherein a first entry includes a first global identifier, a second entry includes a second global identifier, and a third entry includes the first global identifier and a first local identifier, wherein the first global identifier uniquely identifies the first network apparatus in a segment routing domain, wherein the second global identifier uniquely identifies a remote node in the segment routing domain, and wherein the local identifier uniquely identifies a set of cross-connect instructions within the network apparatus;
   receive an Internet Protocol version 6 (IPv6) packet with a header including a destination address in a destination address field of the header, wherein the destination address comprises a microsegment block, concatenated with one or more global identifiers and zero or more local identifiers;
   look up one or more portions of the destination address for one or more matching entries in the forwarding information base;
   responsive to one of the longest matching entries being the first entry, executing a first set of packet processing instructions on the received IPv6 packet, wherein the first set of packet processing instructions comprises:
      modifying the received IPv6 packet to create an updated destination address for the IPv6 packet by shifting bits of the destination address after the first global identifier such that the updated destination address includes the microsegment block concatenated with the second global identifier; and
      forwarding the updated IPv6 packet based on a lookup operation against the updated destination address in the forwarding information base; and
   responsive to the longest matching entry being the second entry,
      modifying the received IPv6 packet to create an updated destination address for the IPv6 packet by shifting bits of the destination address after the first global identifier and the first local identifier such that the updated destination address includes the microsegment block concatenated with the second global identifier; and
      forwarding the updated IPv6 packet looking up the cross-connect instructions associated with the first local identifier.

2. The first network apparatus of claim 1, wherein the cross-connect instructions identify an interface of the first network apparatus, and wherein the updated IPv6 packet is forwarded from the identified interface.

3. The first network apparatus of claim 1, wherein the cross-connect instructions are operative to cause the network apparatus to cross-connect to a neighbor network apparatus, wherein an interface connecting to the neighbor network apparatus is identified by the local identifier.

4. The first network apparatus of claim 1, wherein the first global identifier is advertised by the first network apparatus within a network domain, wherein network apparatuses within the network domain update their corresponding forwarding information bases upon receiving the advertised first global identifier such that a packet sent using an address including the first global identifier is delivered to the first network apparatus within the network domain.

5. The first network apparatus of claim 1, wherein a fourth entry in the forwarding information database includes the first global identifier concatenated with an end identifier; and wherein the instructions are operable when executed by the one or more processors to cause the first network apparatus to:
   responsive to the longest matching entry being the fourth entry,
      identify one or more instructions associated with a combination of the first global identifier and the end identifier;
      perform one or more functions instructed by the one or more instructions, wherein the one or more functions comprise determining a forwarding rule associated with the packet; and
      forward the packet based on the forwarding rule.

6. The first network apparatus of claim 5, wherein the end identifier indicates that the first global identifier is a last global identifier corresponding to a network apparatus in the destination address.

7. The first network apparatus of claim 5, wherein the one or more functions comprise:
   replacing the destination address in the destination address field of the header with a second address from one of one or more inner headers; and
   determining a forwarding rule associated with the second address.

8. The first network apparatus of claim 7, wherein a next header field of the outer header indicates a segment routing header, and wherein the one of the one or more inner headers is a segment routing header.

9. The first network apparatus of claim 1 wherein a fourth entry in the forwarding information database includes the first global identifier concatenated with the first local identifier and an end identifier, and wherein the instructions are operable when executed by the one or more processors to cause the first network apparatus to:
responsive to the longest matching entry being the fourth entry,
identify one or more instructions associated with a combination of the first global identifier, the first local identifier and the end identifier;
perform one or more functions instructed by the one or more instructions, wherein the one or more functions comprise determining a forwarding rule associated with the packet; and
forward the packet based on the forwarding rule.

10. The first network apparatus of claim 9, wherein the one or more functions corresponding to the one or more instructions comprise decapsulating an outer header and zero or more extension headers of the outer header from the packet.

11. The first network apparatus of claim 10, wherein the one or more functions corresponding to the one or more instructions further comprises forwarding the decapsulated packet to a neighbor network apparatus, wherein an interface connecting to the neighbor network apparatus is identified by the local identifier.

12. The first network apparatus of claim 11, wherein the one or more functions corresponding to the one or more instructions further comprises determining a forwarding rule associated with a destination address in the decapsulated packet.

13. The first network apparatus of claim 12, wherein determining the forwarding rule comprises looking up the destination address in a forward table identified by the local identifier.

14. In a first network apparatus, a method comprising:
maintaining a forwarding information base comprising a plurality of entries, wherein a first entry includes a first global identifier, a second entry includes a second global identifier, and a third entry includes the first global identifier and a first local identifier, wherein the first global identifier uniquely identifies the first network apparatus in a segment routing domain, wherein the second global identifier uniquely identifies a remote node in the segment routing domain, and wherein the local identifier uniquely identifies a set of cross-connect instructions within the network apparatus;
receiving an Internet Protocol version 6 (IPv6) packet with a header including a destination address in a destination address field of the header, wherein the destination address comprises a microsegment block, concatenated with one or more global identifiers and zero or more local identifiers;
looking up one or more portions of the destination address for one or more matching entries in the forwarding information base;
responsive to one of the longest matching entries being the first entry, executing a first set of packet processing instructions on the received IPv6 packet, wherein the first set of packet processing instructions comprises:
modifying the received IPv6 packet to create an updated destination address for the IPv6 packet by shifting bits of the destination address after the first global identifier such that the updated destination address includes the microsegment block concatenated with the second global identifier; and
forwarding the updated IPv6 packet based on a lookup operation against the updated destination address in the forwarding information base; and responsive to the longest matching entry being the second entry,
modifying the received IPv6 packet to create an updated destination address for the IPv6 packet by shifting bits of the destination address after the first global identifier and the first local identifier such that the updated destination address includes the microsegment block concatenated with the second global identifier; and
forwarding the updated IPv6 packet looking up the cross-connect instructions associated with the first local identifier.

15. The method of claim 14, wherein the cross-connect instructions identify an interface of the first network apparatus, and wherein the updated IPv6 packet is forwarded from the identified interface.

16. The method of claim 14, wherein the cross-connect instructions are operative to cause the network apparatus to cross-connect to a neighbor network apparatus, wherein an interface connecting to the neighbor network apparatus is identified by the local identifier.

17. The method of claim 14, wherein the first global identifier is advertised by the first network apparatus within a network domain, wherein network apparatuses within the network domain update their corresponding forwarding information bases upon receiving the advertised first global identifier such that a packet sent using an address including the first global identifier is delivered to the first network apparatus within the network domain.

18. The method of claim 14, wherein a fourth entry in the forwarding information database includes the first global identifier concatenated with an end identifier; the method further comprising:
responsive to the longest matching entry being the fourth entry,
identifying one or more instructions associated with a combination of the first global identifier and the end identifier;
performing one or more functions instructed by the one or more instructions, wherein the one or more functions comprise determining a forwarding rule associated with the packet; and
forwarding the packet based on the forwarding rule.

19. The method of claim 18, wherein the end identifier indicates that the first global identifier is a last global identifier corresponding to a network apparatus in the destination address.

20. The method of claim 18, wherein the one or more functions comprise:
replacing the destination address in the destination address field of the header with a second address from one of one or more inner headers; and
determining a forwarding rule associated with the second address.

21. The method of claim 20, wherein a next header field of the outer header indicates a segment routing header, and wherein the one of the one or more inner headers is a segment routing header.

22. The method of claim 14, wherein a fourth entry in the forwarding information database includes the first global identifier concatenated with the first local identifier and an end identifier, the method further comprising:
responsive to the longest matching entry being the fourth entry,
identifying one or more instructions associated with a combination of the first global identifier, the first local identifier and the end identifier;

performing one or more functions instructed by the one or more instructions, wherein the one or more functions comprise determining a forwarding rule associated with the packet; and forwarding the packet based on the forwarding rule.

23. The method of claim 22, wherein the one or more functions corresponding to the one or more instructions comprise decapsulating an outer header and zero or more extension headers of the outer header from the packet.

24. The method of claim 23, wherein the one or more functions corresponding to the one or more instructions further comprises forwarding the decapsulated packet to a neighbor network apparatus, wherein an interface connecting to the neighbor network apparatus is identified by the local identifier.

25. The method of claim 24, wherein the one or more functions corresponding to the one or more instructions further comprises determining a forwarding rule associated with a destination address in the decapsulated packet.

26. The method of claim 25, wherein determining the forwarding rule comprises looking up the destination address in a forward table identified by the local identifier.

* * * * *